United States Patent

Kramb

[11] 4,009,156
[45] Feb. 22, 1977

[54] HYDROXYNAPHTHALENE TRISAZO DYESTUFFS

[75] Inventor: Hans Kramb, Barcelona, Spain

[73] Assignee: Bayer Aktiengesellschaft, Leverkusen, Germany

[22] Filed: Apr. 25, 1975

[21] Appl. No.: 571,865

[30] Foreign Application Priority Data

May 4, 1974 Germany .................. 2421654

[52] U.S. Cl. .............. 260/169; 260/159; 260/184; 260/191; 260/205
[51] Int. Cl.² ............. C09B 31/22; C09B 31/28; C09B 33/20; C09B 35/38
[58] Field of Search .......... 260/169, 173, 170, 172; 8/41 B

[56] References Cited
UNITED STATES PATENTS

| | | | |
|---|---|---|---|
| 536,532 | 3/1895 | Kirchhoff | 260/169 |
| 536,879 | 4/1895 | Kirchhoff | 260/169 |
| 536,880 | 4/1895 | Kirchhoff | 260/169 |
| 615,497 | 12/1898 | Ris et al. | 260/169 |
| 658,897 | 10/1900 | Israel et al. | 260/169 |
| 1,209,154 | 12/1916 | Haugwitz | 260/169 |
| 2,203,196 | 6/1940 | Hanhart | 260/143 |
| 2,286,714 | 6/1942 | Chechak | 260/169 X |
| 2,777,839 | 1/1957 | Bockmann et al. | 260/169 |
| 3,487,067 | 12/1969 | Mudrak et al. | 260/173 |

Primary Examiner—Daniel E. Wyman
Assistant Examiner—John J. Doll
Attorney, Agent, or Firm—Plumley and Tyner

[57] ABSTRACT

The subject matter of the invention is trisazo dyestuffs, which in the form of the free acid correspond to general formula

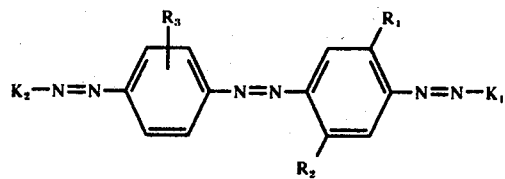

wherein $K_1$ denotes the radical of the 2,8-dihydroxynaphthalene-6-sulfonic acid (coupled in alkaline medium) or of the 2-amino-8-hydroxynaphthalene-6-sulfonic acid (coupled in acidic medium), $K_2$ denotes the radical of a coupling component, $R_1$ denotes hydrogen or methoxy, $R_2$ denotes hydrogen or methyl and $R_3$ denotes hydrogen or chlorine, with the proviso that the total number of sulfonic acid groups is 1 or 2.

3 Claims, No Drawings

HYDROXYNAPHTHALENE TRISAZO DYESTUFFS

The subject matter of the invention is trisazo dyestuffs, which in the form of the free acid correspond to general formula (I)

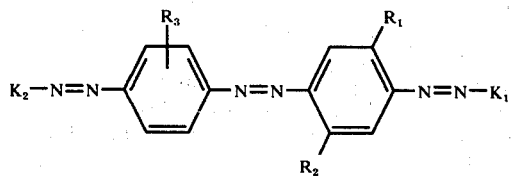

wherein $K_1$ denotes the radical of the 2,8-dihydroxynaphthalene-6-sulfonic acid (coupled in alkaline medium) or of the 2-amino-8-hydroxynaphthalene-6-sulfonic acid (coupled in acidic medium), $K_2$ denotes the radical of a coupling component, $R_1$ denotes hydrogen or methoxy, $R_2$ denotes hydrogen or methyl and $R_3$ denotes hydrogen or chlorine, with the proviso that the total number of sulfonic acid groups is 1 or 2.

The dyestuffs are prepared by diazotising amines of the formula

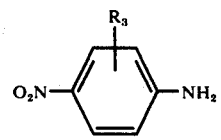

wherein $R_3$ denotes hydrogen or chlorine, and coupling with amines of the formula

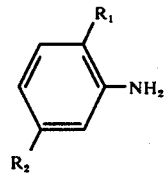

wherein $R_1$ denotes hydrogen or methoxy and $R_2$ denotes hydrogen or methyl or with the ω-methane sulfonic acid of said amine, optionally splitting off the sulfonyl methyl radical, further diazotising, coupling on 2,8-dihydroxynaphthalene-6-sulfonic acid in alkaline medium or on 2-amino-8-hydroxynaphthalene-6-sulfonic acid in acidic medium, reducing the nitro group with sodium sulfide, diazotising and coupling with a coupling component $K_2H$.

Suitable coupling components $K_2H$ are for example phenole, phenole-2-sulfonic acid, o-cresol, p-cresol, resorcinol, m-aminophenole, m-phenylenediamine, 1,3-phenylenediamine-4-sulfonic acid, 2,4-toluylenediamine-5-sulfonic acid, 2-amino-8-hydroxynaphthalene-6-sulfonic acid, 2,8-dihydroxynaphthalene-6-sulfonic acid, 1-(p-sulfophenyl)-3-methyl-5-hydroxypyrazol, 1-naphthol-3-sulfonic acid, 2-naphthol-6-sulfonic acid and 2-naphthol-8-sulfonic acid.

Preferred dyestuffs correspond to the formula

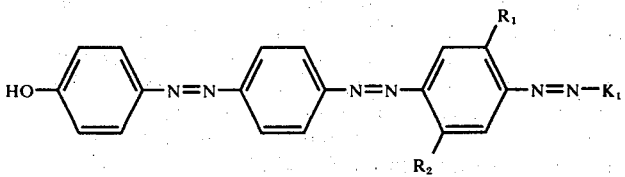

wherein $R_1$, $R_2$ and $K_1$ have the above mentioned meaning.

The dyestuffs of the formula I are especially suitable for dyeing of polyamides, such as poly-ε-caprolactam or condensation products of adipic acid and hexamethylenediamine.

Those dyestuffs I in which $R_1$ is methoxy, $R_2$ is methyl and $K_2$ is a coupling component of the benzene series, dye polyamides in reddish, bluish or greenish black shades of good to very good fastness to water, washing and perspiration. The light fastness is good to very good and sometimes excellent. Further, the dyestuffs show very good building-up properties.

Dyestuffs of formula I in which $K_2$ denotes 2-amino-8-hydroxynaphthalene-6-sulfonic acid coupled in acidic medium, dye polyamides in navy blue shades, whereas dyestuffs of formula I in which $R_1$ and $R_2$ denote hydrogen and $K_2$ is a coupling component of the benzene series, yield brown shades.

Dyestuffs of formula I can be applied in the form of the free acids or of the salts, especially of the alkali metal salts or the ammonium salt. The sodium, lithium or potassium salts are mentioned particularly.

EXAMPLE 1

27,6 g p-nitroaniline are diazotised with 50 ml hydrochloric acid and 13,8 g sodium nitrite at 10° C in aqueous solution (about 700 ml). The excess of nitrous acid is then removed by means of amido sulfonic acid. 26,05 g p-cresidine are added to 450 ml water at a temperature of 60° C and dissolved by addition of 14 ml hydrochloric acid (19° Be). The solution is brought to 5° C by addition of ice. The solution of the diazotised p-nitroaniline is allowed to run within 30 minutes to the solution of p-cresidine. The resulting mixture is stirred at 10° C for 16 hours and at 30° C for 2 hours. 38 ml hydrochloric acid (19° Be) and an aqueous solution of 14,3 g sodium nitrite are added. The mixture is stirred for 2 to 3 hours at 30° C. This solution of the diazo azo compound is allowed to run together with an aqueous solution of 46,5 g sodium carbonate to a solution of 48 g 2,8-dihydroxynaphthalene-6-sulfonic acid and 35 g sodium carbonate in 700 ml water at 15° C. The coupling temperature is kept at 15° C by addition of ice. The reaction mixture is stirred for 16 hours. After that the solution of 18 g sodium carbonate is added. The mixture is heated to 40° C and 24,6 g sodium sulfide are added. After 30 minutes of stirring 435 g sodium chloride are added, the mixture is stirred for further 30 minutes and filtered off.

The moist dyestuff paste is stirred with 700 ml water, a pH of 4 to 5 is set up with about 50 ml hydrochloric acid (19° Be) and further 50 ml hydrochloric acid (19° Be) are added. The temperature is adjusted to 0° to 5° C by means of ice and a aqueous solution of 14,8 g sodium nitrite are allowed to run in. After stirring for 3 hours the excess of nitrous acid is destroyed by means of amido sulfonic acid.

19,7 g phenol are dissolved 260 ml water. 17,5 ml sodium hydroxide solution (40° Be) and 70 g sodium carbonate are added and the mixture is cooled to 0° to 5° C. The solution of the diazo disazo compound is allowed to run into the solution of the phenol within 30 minutes. This mixture is stirred for 16 hours.

The dyestuff is precipitated by addition of 54 ml sodium hydroxide solution (40° Be), heating to 80° C and addition of 660 g sodium chloride and filtered off after 30 minutes stirring.

The dyestuff shows an excellent buildung-up on polyamide and dyes this fibre in deep reddish black shades.

If phenol is replaced by corresponding molar amounts of coupling components of the following table dyestuffs are obtained which are as well suitable for the dyeing of polyamides.

| K₂H | shade on polyamide |
|---|---|
| o-cresol | black |
| phenol-o-sulfonic acid | reddish black |
| resorcinol | black |
| m-aminophenol | black |
| 1,3-phenylenediamine-4-sulfonic acid | black |
| 2,4-toluylenediamine-5-sulfonic acid | black |
| 1-(p-sulfophenyl)-3-methyl-5-hydroxy-pyrazol | black |

EXAMPLE 2

48,4 g 4-nitro-4'-aminoazobenzene are diazotised in aqueous solution with 93 ml hydrochloric acid (19° Be) and 13,8 g sodium nitrate at 15° to 20° C. As in example 1 the diazo azo compound is coupled on 2,8-dihydroxynaphthalene-6-sulfonic acid, reduced by means of sodium sulfide, filtered off, diazotised and coupled on phenol. The dyestuffs dyes polyamide in a reddish brown shade.

EXAMPLE 3

The diazo azo compound obtained according to example 1 from p-nitroaniline and p-cresidine are adjusted to pH 2,5 by addition of 60 to 65 ml 20% sodium carbonate solution. This solution is added to a slurry of 2-aminio-8-hydroxynaphthalene-6-sulfonic acid which was prepared corresponding to the following procedure:

47,8 g 2-amino-8-hydroxy-naphthalene-6-sulfonic acid are stirred with water and dissolved by addition of about 50 ml 20% sodium carbonate solution. A temperature of 10° C is set up by addition of ice and 20 ml hydrochloric acid (19° Be) are added whereby the 2-amino-8-hydroxy-6-sulfonic acid precipitates.

After that 300 ml of a 20% solution of sodium acetate is added and the mixture is stirred for 16 hours. The reaction product is adjusted to pH 7 with 80 ml sodium hydroxide solution (40° Be) and 25 g sodium carbonate are added. After heating to 35° 60 C a solution of 22,2 g sodium sulfide in 100 ml water are added and stirring is continued for 40 minutes. The amino disazo dyestuff is isolated by addition of 30 g sodium bicarbonate and 425 g sodium chloride, stirring for further 10 minutes and filtering off. The paste of this amino disazo dyestuff is stirred with 80 ml water for 18 hours and then diazotised by addition of ice, 50 ml hydrochloric acid (19° Be) and 60°ml sodium nitrite solution (23%) at 0 to 5° C. The solution of the diazo disazo dyestuff is allowed to run within 30 minutes to a mixture of 260 ml water, 19,7 g phenol, 17,5 ml sodium hydroxide solution (40° Be) and 70 g sodium carbonate. This mixture is brought to a volume of 1 litre at a temperature of 0° to 5° C by addition of water and ice. After 16 hours the coupling is finished and the dyestuffs is precipitated by addition of 660 g sodium chloride and filtered off.

The dried dyestuffs dyes polyamide fibres in greenish black shades.

Phenol can be replaced by the following coupling components in the same molar ratio and dyestuffs suitable for the dyeing of polyamides are obtained.

| K₂H | shade on polyamide |
|---|---|
| o-cresol | greenish black |
| p-cresol | greenish black |
| phenol-o-sulfonic acid | greenish black |
| resorcinol | greenish black |
| 1,3-phenylenediamine-4-sulfonic acid | bluish black |
| 2,4-toluylenediamine-5-sulfonic acid | black |
| m-phenylenediamine | bluish black |
| 2,8-dihydroxynaphthalene-6-sulfonic acid | navy blue |

EXAMPLE 4

The amino disazo dyestuff of the formula

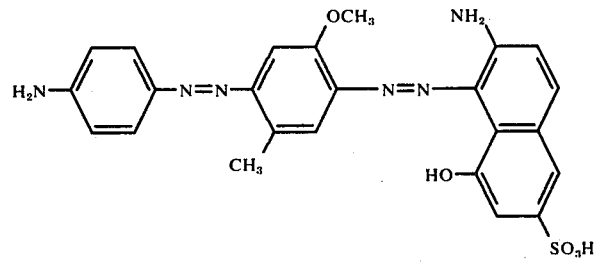

is diazotised corresponding to example 3 and coupled in a weak acidic medium on 2-amino-8-hydroxynaphthalene-6-sulfonic acid (47,8 g). A pH of 4, 5 is set up by addition of 350 ml of a 20% aqueous solution of sodium acetate at a temperature of 5° C. This mixture is stirred for 16 hours. By slow addition of 80 g sodium bicarbonate the pH is adjusted to 6. The mixture is now stirred for 2 hours and brought to pH 9,5 by addition of 40 ml sodium hydroxide solution (40° Be). For isolating the dyestuff the mixture is heated to 80° C and the dyestuff is precipitated with sodium chloride (10% with respect to the volume). The dyestuff dyes polyamide in a navy blue shade.

EXAMPLE 5

The procedure of example 3 is repeated with the exception that instead of 27,6 g p-nitroaniline 31,7 g p-nitro-o-chloroaniline are used. As the last coupling component $K_2H$ instead of phenol phenol-o-sulfonic acid or 1,3-phenylenediamine-4-sulfonic acid are applied. The both dyestuffs dye polyamide greenish and bluish black.

EXAMPLE 6

24,2 g 4-nitro-4'-amino-azo benzene are diazotised in aqueous solution with 40 ml hydrochloric acid (19° Be) and 7 g sodium nitrite. The excess of nitrous acid is distroyed with amido sulfonic acid after a stirring of 3 hours. 25,9 g 2-amino-8-hydroxynaphthalene-6-sulfonic acid are dissolved neutral in 350 ml water at 60° C. This solution runs to a mixture of 200 ml water, 200 g ice and 21 hydrochloric acid (19° Be) and the 2-amino-8-hydroxynaphthalene-6-sulfonic acid is precipitated in a finely devided form. The solution of the diazotised 4-nitro-4-aminoazobenzene is added within 1 hour to this slurry and the pH is set up to 4,5 by addition of 150 ml 20% solution of sodium acetate. After stirring of 16 to 20 hours the pH is adjusted to 7 by means of about 40 ml sodium hydroxide solution (40° Be). 10 g sodium carbonate are added to obtain pH 8,5 and the mixture is heated to 35° C. Then an aqueous solution of 10,7 g sodium sulfide is added and the mixture is stirred for 40 minutes. The reduced dyestuff is precipitated by addition of first 15 g sodium bicarbonate (pH 9,5 to 10) and then 400 g sodium chloride. Stirring is continued for further 10 minutes and the dyestuff is filtered off. The paste of the reduced dyestuff is stirred with 400 ml water. 50 ml hydrochloric acid and ice are added and the dyestuff is diazotised at 0° to 5° C with 7 g sodium nitrite. After a stirring of 3 hours the excess of nitrous acid is destroyed with amido sulfonic acid. To this solution are added an aqueous weakly acidic solution of 25, 2 g 2-amino-8-hydroxynaphthalene-6-sulfonic acid and after that 150 ml sodium acetate solution (20%). The mixture is stirred for 24 hours at pH 4,5. Then 55 ml of an aqueous solution of ammonia (25%) are added. The mixture is heated to 80° C and the dyestuff is precipitated with 110 g sodium chloride.

The dyestuff dyes polyamide navy blue. If instead of 2-amino-8-hydroxynaphthalene-6-sulfonic acid phenol is used as the last coupling component the following procedure is followed:

9,9 g phenol are dissolved in 130 ml water and 9 ml sodium hydroxide solution (40° Be). 35 g sodium carbonate and ice are added. The diazotised disazo dyestuff is added to the phenol solution within 30 minutes. The coupling mixture is stirred for 16 hours. For isolating the dyestuff the mixture is heated to 80° C, 90 g sodium chloride are added and the dyestuff is filtered off after 15 minutes stirring.

The dyestuff dyes polyamide in deep brown shades.

Instead of phenol phenol-o-sulfonic acid, 1,3-phenylenediamine-4-sulfonic acid or 1-(p-sulfophenyl)-3-methyl-5-hydroxyprazol can be coupled in the same way.

The corresponding dyestuffs dye polyamide in brown shades.

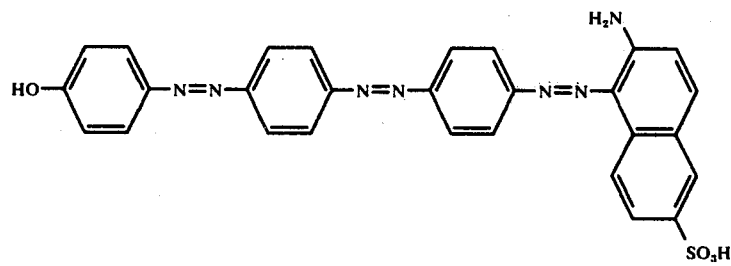

I claim:

1. Trisazo dyestuff which in the form of the free acid corresponds to the formula

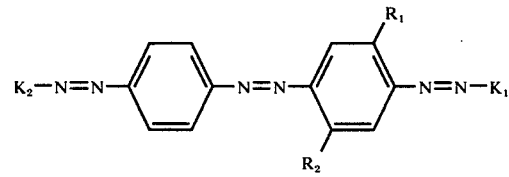

wherein
$K_1$ is 2,8-dihydroxynaphthalene-6-sulfonic acid, coupled in alkaline medium, or 2-amino-8-hydroxynaphthalene-6-sulfonic acid, coupled in acidic medium,
$K_2$ is hydroxyphenyl, 2-sulpho-hydroxyphenyl, 2-methylhydroxyphenyl, 4-methylhydroxyphenyl, 1,3-dihydroxyphenyl, 3-aminohydroxyphenyl,
$R_1$ is hydrogen or methoxy, and
$R_2$ is hydrogen or methyl, with the proviso that the total number of sulfonic acid groups is 1 or 2.

2. Triasazo dyestuffs of claim 1, which in the form of the free acid correspond to the formula

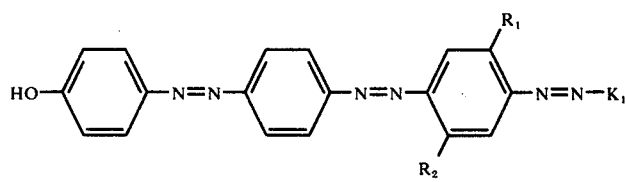

wherein
$K_1$ denotes 2,8-dihydroxynaphthalene-6-sulfonic acid or 2-amino-8-hydroxynaphthalene-6-sulfonc acid, coupled in acidic medium,
$R_1$ denotes hydrogen or methoxy,
$R_2$ denotes hydrogen or methyl.

3. Dyestuff of claim 1 of the formula